A. ONWOOD.
ELECTRICAL MEASURING INSTRUMENT.
APPLICATION FILED APR. 10, 1914.

1,187,377.

Patented June 13, 1916.

WITNESSES
H. Woodard

INVENTOR
Andre Onwood
BY H. B. Willson & Co.
ATTORNEYS

UNITED STATES PATENT OFFICE.

ANDRE ONWOOD, OF SOUTHFIELD, LONDON, ENGLAND.

ELECTRICAL MEASURING INSTRUMENT.

1,187,377.   Specification of Letters Patent.   Patented June 13, 1916.

Application filed April 10, 1914. Serial No. 831,089.

*To all whom it may concern:*

Be it known that I, ANDRE ONWOOD, subject of the King of Great Britain and Ireland, residing at 30 Hambledon road, Southfield, in the county of London, England, British Isles, have invented certain new and useful Improvements in Electrical Measuring Instruments, of which the following is a specification.

This invention relates to galvanometers, voltmeters, ammeters and like instruments of the kind wherein there is a coil movable between the poles of a magnetic field.

In some instruments of this kind heretofore suggested, the moving coil has been made circular and has been supported on a single pivot forming a fulcrum, which is arranged at the center of said coil and of a fixed spherical iron core, the magnet that provides the magnetic field in which the coil moves also having its pole faces arranged concentrically. By this means when the coil moves relatively to said core and pole faces, all its parts will move in paths concentric to the surface of said core and pole faces and thus will not come into contact therewith, thereby rendering exact leveling of the instrument unnecessary. In such instruments however, the sensitiveness is limited to that of a pivot which by reason of its friction does not allow a coil supported thereon to move exactly to the position corresponding to the forces acting thereon, unless the instrument be tapped. Moreover the jewels and pivots of such support are liable to be damaged if the instruments be roughly handled.

According to this invention, in order to produce a moving coil instrument without a pivotal support for the moving coil, which can be used on any approximately level surface without leveling, the moving coil is suspended by means of a flexible strip, wire or the like extending from a support arranged at or near the center of the coil down to the coil, or to a piece fixed to sail coil, means being provided for maintaining the coil in an upright position. An extremely delicate suspension is thus obtained which can nevertheless be subjected to somewhat rough handling without damage and since the coil is suspended from a point at its center, its parts will always move in curvilinear paths having said points for their center, and will thus not come into contact with the pole faces or with a central fixed core.

The accompanying drawings illustrate one manner in which this invention may be conveniently and advantageously carried into practice.

Figure 1:
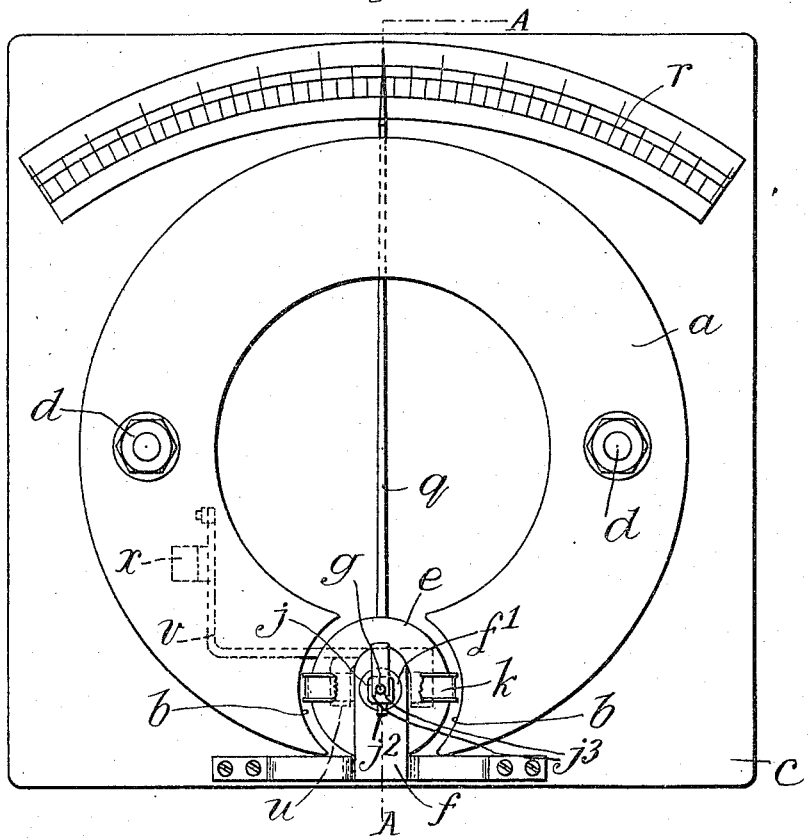
Figure 3:
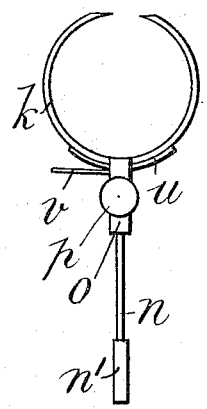
Figure 2:
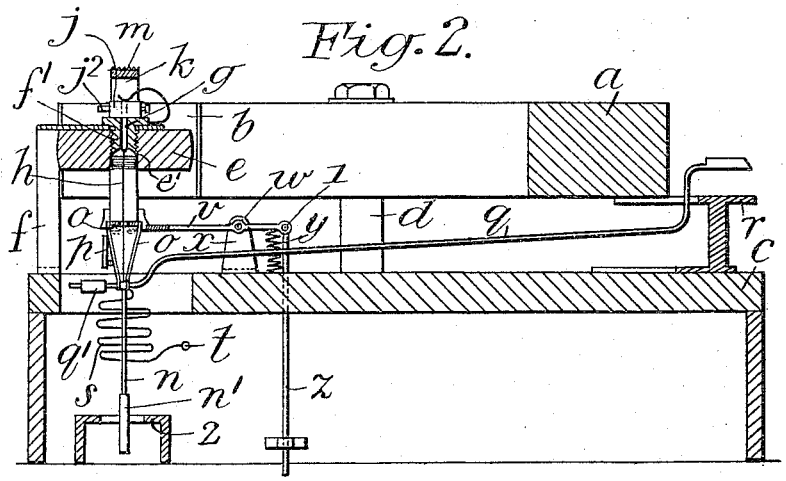
Figure 4:
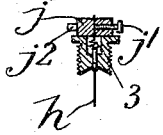

Figure 1 is a plan of a galvanometer constructed according to this invention, the upper part of the moving coil being broken away. Fig. 2 is a vertical section on the line A, A, Fig. 1. Figs. 3 and 4 show details of construction.

$a$ is a permanent magnet having pole-faces $b, b$, which are connected to form part of a cylindrical surface.

$c$ is a base on which the magnet $a$ is supported by pillars $d, d$.

Between the pole-faces $b, b$ of the magnet, there is concentrically supported a segment $e$ of a soft iron sphere, which is made with parallel faces arranged horizontally and substantially equidistant from the center of the spherical surface. The said segment is secured to a bracket $f$ by means of a screw $f'$ which is threaded in an aperture $e'$ disposed centrally within the segment $e$. This screw $f'$ has an axial bore which rests on a rod $g$ to the lower end of which is soldered the upper end of a flexible strip $h$, for example of phosphor bronze. The upper end of the rod $g$ is secured by means of a setscrew $j'$ to a head $j$ that rests on the top of the screw $f$ and is provided with an arm $j^2$ whereby the head $j$ and the rod $g$ can be readily turned, for example, in order to bring the pointer or other indicator to zero. The ends $j^3, j^3$ of a spring secured to the bracket $f$ press on the upper surface of the head $j$ and serve to retain it in any position to which it may be adjusted. The lower end of the strip $h$ passes through a hole in the lower part of a circular former $k$, on which the movable coil $m$ is wound, and is attached to the upper end of a rod $n$, which bears a weight $n'$ and is secured to the former $k$ by means of side-plates $o, o$. This weighted rod serves to hold the coil $m$ in an upright position.

The former $k$ is preferably made of a metal of high electrical conductivity, so as, in conjunction with the magnetic field in which it moves, to damp the oscillations of the moving coil. The lower end of the rod $g$ is positioned at a point coincident with the center of the coil $m$ and the segment $e$, so that the said coil will always move in curvilinear paths about this point even though the base $c$ may not be level. Thus it may be seen that the coil will not come into contact either with the pole-faces $b$, $b$ or with said segment unless it is caused to vibrate violently by a sudden jar. On the outer plate $o$ is mounted a mirror $p$ whereby the deflections of the coil can be observed by means of a beam of light and a scale while on the inner plate $o$ is mounted a pointer $q$ which moves over a scale $r$ on the base $c$, and is provided with a counter-balance weight $q'$. One terminal of the coil $m$ is connected through the former $k$ and plates $o$, $o$ to the strip $h$ and the other to a flexible ligament $s$ whereby it is connected to a terminal $t$ on the base $c$. The circuit of the instrument thus extends from the bracket $f$, through the segment $e$, rod $g$, strip $h$, plates $o$, $o$, former $k$, coil $m$, and ligament $s$ to the terminal $t$.

By arranging the free end of the pointer $q$ at substantially the same level as the point of support of the strip $h$, and concentrating the magnetic field along a horizontal line by means of a core in the form of a segment of a sphere and cylindrical pole-faces as shown, any error due to the end of the pointer not moving parallel to the scale $r$ will be compensated by a reduction in torque on the moving system due to the different position of the axis of the coil $m$ relatively to the axis of the polar surfaces.

A device is also shown whereby the weight of the coil $m$ and connected parts can be automatically removed from the strip $h$ when the instrument is being carried about. This device, comprises a crutch $u$, that is adapted to engage the underside of the coil $m$. This crutch is mounted on one end of a lever $v$ pivoted at $w$ to a bracket $x$, the other end of the said lever being acted on by a tension spring $y$, which tends to bring the lever $v$ into such a position that the former $k$ is raised into contact with the segment $e$ and the strip $h$ is unstressed. The lever $v$ is also provided with a rod $z$ pivoted to it at $1$ and extending through the base of the instrument to such a distance below the same that it will come into contact with the table or other surface on which the instrument rests when in use and be pushed upward by the weight of the said instrument. By this means, the lever $v$ is rocked so as to withdraw the crutch $u$ from beneath the coil $m$ and thus allow said coil to move freely on its suspension $h$.

In order to limit the oscillation of the moving system the weight $n'$ is surrounded at a suitable distance by a guard-ring 2, which may be advantageously covered with wash-leather, india rubber or like yielding material. In some cases, moreover, a spiral spring can be interposed between the strip or wire $h$ and the head $j$, in order to absorb shocks and prevent fracture of said strip or wire, for example, as shown at 3 in Fig. 4.

In a further modification, the magnet $a$ can be arranged vertically, instead of horizontally as shown in Figs. 1 and 2. In such vertical form, the pole faces are preferably arranged at the top, so that the counter weight hangs in the interior space of said magnet. This form can be made very compact, especially in cases where a pointer is not required, the readings being taken by means of the mirror only.

As various other changes in form and proportion may be made without departing from the spirit of this invention, it is to be understood that I do not wish to be limited to the construction herein shown and described, other than that set forth in the appended claims:

1. In an electrical measuring instrument, the combination of a magnet, a moving circular coil disposed between the poles of said magnet, said coil being suspended from its center, and means for maintaining said coil in upright position.

2. In an electrical measuring instrument, the combination of a magnet, a moving circular coil disposed between the poles of said magnet, a flexible strip secured to the lower side of said coil, means for suspending said strip from a point coincident with the center of said coil, and means for maintaining said coil in upright position.

3. In an electrical measuring instrument, the combination of a magnet, a spherical segment of a magnet substance supported between the poles of said magnet, a moving circular coil disposed between poles of said magnet and around said segment, a flexible strip secured to the lower side of said coil, means secured to said segment for suspending said strip from a point coincident with the center of said coil, and means for maintaining said coil in upright position.

4. In an electrical measuring instrument, the combination of a magnet having its pole faces curved to form part of a cylindrical surface, a spherical segment of a magnetic substance supported concentrically between said pole faces, said segment having a centrally arranged threaded aperture therein, a screw secured in said aperture, a moving circular coil disposed between said pole faces and around said segment, a flexible strip secured at one end to the lower side of said coil, the other end of said strip being secured to said screw at a point coincident with the center of said coil, and means for maintaining said coil in upright position.

5. In an electrical measuring instrument, the combination of a magnet having its pole faces curved to form a part of a cylindrical surface, a spherical segment of a magnetic substance supported concentrically between said pole faces, said segment having a centrally arranged threaded aperture therein, a screw secured in said aperture, said screw having an axial bore, a rod rotatively mounted in said bore, a moving circular coil disposed between said pole faces and around said segment, a flexible strip secured at one end to the lower side of said coil, the other end of said strip being secured to said rod at a point coincident with the center of said coil, and means for maintaining said coil in upright position.

6. In an electrical measuring instrument, the combination of a base, a permanent magnet secured to said base, a bracket secured to said base, a spherical segment secured to said bracket, said segment being disposed between the poles of said magnet, a coil disposed between said poles and around said segment, a flexible element secured to the lower side of said coil, said flexible element being suspended from said segment at a point coincident with the center of said coil, a rod depending from the lower side of said coil, and a weight on the lower end of said rod for maintaining said coil in upright position.

In testimony whereof I have affixed my signature, in presence of two witnesses.

ANDRE ONWOOD.

Witnesses:
S. NASH,
S. CLARKSON.

Copies of this patent may be obtained for five cents each, by addressing the "Commissioner of Patents, Washington, D. C."